US009371432B2

(12) United States Patent
Ismail et al.

(10) Patent No.: US 9,371,432 B2
(45) Date of Patent: Jun. 21, 2016

(54) NATURAL RUBBER CONTAINING NANOCARBON

(75) Inventors: Surina Ismail, Kuala Lumpur (MY); Azemi Bin Samsuri, Selangor (MY)

(73) Assignee: AMRIL AG, Zug (CH)

( * ) Notice: Subject to any disclaimer, the term of this patent is extended or adjusted under 35 U.S.C. 154(b) by 0 days.

(21) Appl. No.: 14/418,596

(22) PCT Filed: Aug. 2, 2012

(86) PCT No.: PCT/MY2012/000221
§ 371 (c)(1),
(2), (4) Date: Mar. 24, 2015

(87) PCT Pub. No.: WO2014/021704
PCT Pub. Date: Feb. 6, 2014

(65) Prior Publication Data
US 2015/0259502 A1    Sep. 17, 2015

(51) Int. Cl.
*C08K 3/04*    (2006.01)
*C08L 7/02*    (2006.01)
*C08K 3/22*    (2006.01)
(Continued)

(52) U.S. Cl.
CPC ... *C08K 3/04* (2013.01); *C08K 3/22* (2013.01); *C08K 5/09* (2013.01); *C08K 5/18* (2013.01); *C08K 5/47* (2013.01); *C08K 7/00* (2013.01);
(Continued)

(58) Field of Classification Search
CPC .......... C08K 3/04; C08L 7/02; C08L 2666/55
USPC ................................ 524/424, 575.5; 977/753
See application file for complete search history.

(56) References Cited

U.S. PATENT DOCUMENTS

2012/0190772 A1    7/2012    Weng et al.

FOREIGN PATENT DOCUMENTS

| CN | 1663991 A | 9/2005 |
|----|-----------|--------|
| CN | 1673261 A | 9/2005 |

(Continued)

OTHER PUBLICATIONS

Anoop et al. (International Journal of Polymeric Materials and Polymeric Biomaterials, 59 (1), 2010, 33-44).*

(Continued)

*Primary Examiner* — Vu A Nguyen
(74) *Attorney, Agent, or Firm* — Smith Moore Leatherwood LLP; Philip P. McCann

(57) ABSTRACT

The invention relates to the use of nanocarbon (carbon nano tubes and/or carbon nano fibers) in the preparation of reinforced natural rubber. It is an object of the invention to provide a simple way to disperse nanocarbon in rubber so as to obtain good physical and mechanical properties, such as hardness, modulus and/or tensile strength. In order to achieve these objects, the invention provides a natural rubber composition comprising 5 parts per hundred of rubber (pphr) or less of nanocarbon, wherein the nanocarbon has not been subjected to an acid treatment before incorporation into the rubber composition. Furthermore, the invention also provides a method of making a natural rubber composition comprising nanocarbon, wherein the method comprises the following steps: (i) providing a dispersion of nanocarbon in a aqueous medium, and (ii) combining the dispersion of nanocarbon with a natural rubber latex; and wherein the nanocarbon is not subjected to an acid treatment before incorporation into the rubber composition and the natural rubber composition comprises 5 pphr or less of nanocarbon.

16 Claims, 1 Drawing Sheet

(51) Int. Cl.
  *C08K 5/09* (2006.01)
  *C08K 5/18* (2006.01)
  *C08K 5/47* (2006.01)
  *C08K 7/00* (2006.01)

(52) U.S. Cl.
  CPC ... *C08K 2003/045* (2013.01); *C08K 2003/2296* (2013.01); *C08K 2201/011* (2013.01)

(56) References Cited

FOREIGN PATENT DOCUMENTS

| | | | |
|---|---|---|---|
| EP | 1466940 | A1 | 10/2004 |
| EP | 1659158 | A2 | 5/2006 |
| EP | 1749853 | A2 | 2/2007 |
| EP | 2338697 | A1 | 6/2011 |
| EP | 2366559 | A1 | 9/2011 |
| JP | 2004-101958 | A | 4/2004 |
| JP | 2004-210830 | A | 7/2004 |
| JP | 2005-046605 | A | 2/2005 |
| JP | 2009-191198 | A | 8/2009 |
| KR | 20050027415 | A | 3/2005 |
| WO | 03/060002 | A1 | 7/2003 |
| WO | 2012/080158 | A1 | 6/2012 |

OTHER PUBLICATIONS

Machine translation CN1663991 A to Liang et al.*
Aldrich Carbon Nanotubes.*
Ma et al. (Composites: Part A 41 (2010) 1345-1367).*
International Search Report mailed on May 16, 2013 in PCT/MY2012/000221 (4 pages).
International Search Report mailed on Oct. 14, 2014 in PCT/IB2012/002563 (5 pages).
Ismail, U.S. Appl. No. 14/418,632, filed Jan. 30, 2015.
Abdul-Lateef et al., "Effect of Multi-Walled Carbon Nanotubes on the Mechanical and Thermal Properties of Natural Rubber," The Arabian Journal for Science and Engineering, vol. 35, No. 1, copyright 2010, pp. 49-56 (8 pages).
Carretero-González et al., "Effect of Nanoclay on Natural Rubber Microstructure," Macromolecules, Copyright 2008, vol. 41, pp. 6763-6772 (10 pages).
Qian et. al., "Load transfer and deformation mechanisms in carbon nanotube-polystyrene composites," Applied Physics Letters, Copyright 2000, vol. 76, No. 20, pp. 2868-2870 (3 pages).
Wang et al., "Preparation and mechanical properties of natural rubber powder modified by carbon nanotubes", Journal of Applied Polymer Science, vol. 100, No. 6, Copyright 2006, pp. 4697-4702 (6 pages).

* cited by examiner

NATURAL RUBBER CONTAINING NANOCARBON

This application is a national stage application under 35 U.S.C. §371 of International Application No. PCT/MY2012/000221 filed 2 Aug. 2012, the disclosure of which is expressly incorporated herein by reference.

FIELD OF THE INVENTION

The present invention relates to the use of nanocarbon (carbon nanotubes and/or carbon nanofibers) in the preparation of reinforced natural rubber.

TECHNICAL BACKGROUND

Carbon nanotubes (CNTs) are allotropes of carbon with a unique atomic structure consisting of covalently bonded carbon atoms arranged in long cylinders with typical diameters in the range of 1 to 50 nm and a wide variety of lengths (Rubber Nanocomposites: Preparation, Properties and Applications; edited by Sabu Thomas and Ranimol Stephen, John Wiley & Sons, 2010). Based on the fast growing knowledge about the physical and chemical properties, nanosize carbon structures such as carbon nanotubes or carbon nanofibers (CNT or CNF) have found a wide range of industrial applications including field effect transistors, one-dimensional quantum wires, field emitters and hydrogen storage. Individual carbon nanotubes are characterized by a high aspect ratio (300 to 1000), high flexibility and unique combination of mechanical, electrical and thermal properties. The combination of these properties with a very low mass density makes them potentially useful as ideal reinforcing fibers for high-performance polymer composites.

However, one of the main problems for the effective use of carbon nanotubes as reinforcements of polymer matrices is achieving a good dispersion in the composite, independent of filler shape and aspect ratio. Unless uniform dispersion of CNT within the polymer matrix is obtained, enhancement in mechanical strength and other relevant physical properties is not achieved. Direct incorporation of CNT into dry natural rubber through mixing processes like those used for other common fillers is not as easy as, for example, the incorporation of carbon black. Rubber is a very viscous material. It is a very difficult task to disperse a very light material such as CNT into a very viscous medium such as natural rubber and other elastomers. Conventional mixing equipment, such as 2-roll mills, kneaders and internal mixers or even twin screw extruders, is not able to provide efficient dispersion of CNT in the rubber matrix.

Most reports and publications concerning nanoparticulate fillers for polymers relate to thermoplastics, but almost none to dry rubber. The main reason is that it is more difficult to mix nanoparticulate fillers into rubber than into thermoplastics since the former is a much more viscous material than the latter because the molecular weight of rubber is substantially higher than that of thermoplastics. The most important aspect of mixing is the final dispersion of the filler in the rubber matrix.

Carbon nanotubes as usually supplied consist largely of aggregates, but reinforcement comes from individual particles. Intercalation and exfoliation denote CNT dispersion and interaction with the polymer matrix, respectively. If intercalation and exfoliation are not attained during mixing, the final outcome is very poor mechanical strength. Thus, mixing of CNTs with rubber using conventional methods does not produce the desired physical properties and mechanical strength. The root cause of the problem is associated with the poor dispersion of nanocarbon in the rubber matrix due to the high viscosity of dry rubber.

Chinese patent application CN 1663991 A describes a powder natural rubber modified by CNTs and a method of preparing the same. Said powder natural rubber is characterized in that the mass ratio of CNTs to dried rubber of natural rubber latex is in the range from 1% to 50%. The method of preparing the modified rubber requires that the CNTs are subjected to an acid treatment to make them hydrophilic. The method further comprises the steps of mixing the treated CNTs with a dispersant and deionized water to form a CNT/water slurry; modifying the pH value of the slurry to 9 to 12; mixing the slurry with natural rubber latex to form a natural rubber liquid latex added with CNTs; and spraydrying the latex to obtain the powder natural rubber modified with CNTs.

Similarly, Chinese patent application CN 1673261 A describes a natural rubber liquid slurry added with carbon nanotubes characterized in that the total solid contents of CNTs and the dried rubber of the natural rubber latex is in the range from 5% to 30% and a method of preparation such a natural rubber liquid slurry, characterized in that the method comprises the steps of (i) surface treating CNTs such that they become hydrophilic; (ii) mixing the CNTs with dispersant and deionized water to obtain a CNT/water suspension, wherein the mass ratio of dispersant to the said CNTs is in the range from 5% to 20%; (iii) adjusting the pH of the suspension to 9 to 12; and (iv) homogenously mixing the pH adjusted CNT/water suspension with natural latex to obtain a natural rubber liquid slurry with added CNTs.

However, there remains a need to simplify the preparation of nanocarbon reinforced natural rubber and to improve the mechanical properties thereof.

Thus, it is an object of the present invention to provide a simple way to overcome the problem of the very high viscosity of dry natural rubber which consequently leads to agglomeration and very poor dispersion of nanocarbon in the rubber matrix which in turn results in poor mechanical properties, especially poor mechanical strength. It is a further object of the present invention to provide a natural rubber composition reinforced with nanocarbon that has or results in improved physical and mechanical properties, such as improved hardness, improved modulus and/or improved tensile strength.

SUMMARY OF THE INVENTION

In order to achieve these objects, the invention provides a natural rubber composition comprising 5 parts per hundred of rubber (pphr) or less of nanocarbon, wherein the nanocarbon has not been subjected to an acid treatment before incorporation into the rubber composition.

Furthermore, the invention also provides a method of making a natural rubber composition comprising nanocarbon, wherein the method comprises the following steps: (i) providing a dispersion of nanocarbon in a aqueous medium, and (ii) combining the dispersion of nanocarbon with a natural rubber latex; and wherein the nanocarbon is not subjected to an acid treatment before incorporation into the rubber composition and the natural rubber composition comprises 5 pphr or less of nanocarbon.

DETAILED DESCRIPTION OF THE INVENTION

Figure 1:
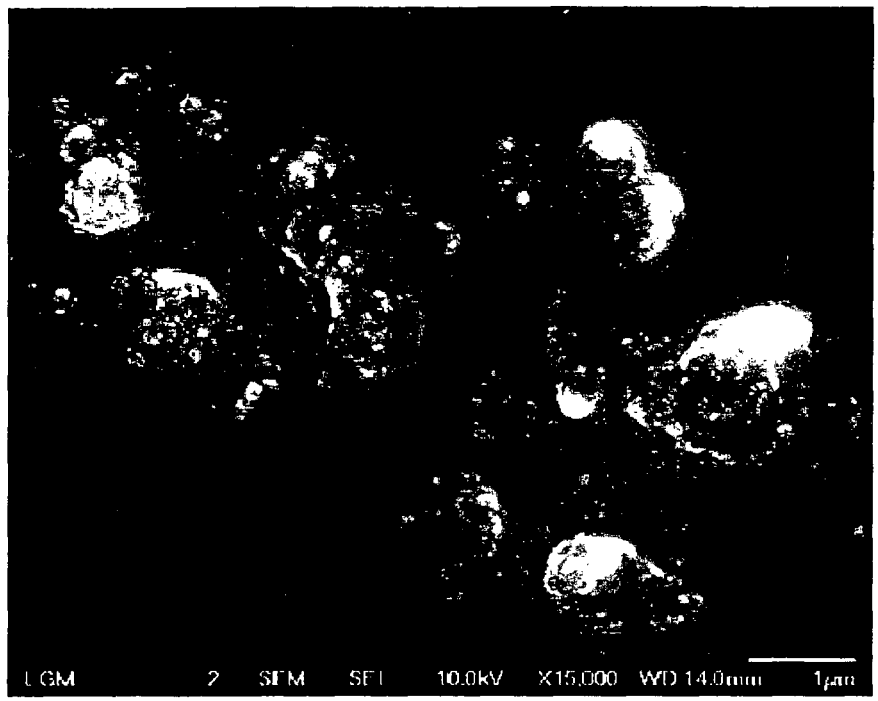
FIG. 1 is a Scanning Electron Microscopy (SEM) image of the fractured surface of vulcanized natural rubber mixed with 5 pphr of CNT at 10,000-fold magnification.

The natural rubber used in the invention can be any natural rubber. The natural rubber is employed in the form of a latex. i.e. a stable dispersion (emulsion) of rubber microparticles in an aqueous medium. The latex can be provided as a latex concentrate, for example as a so-called high ammonia (HA) natural rubber (NR) latex. Such concentrate can be diluted with distilled water (in order to reduce the viscosity of the latex to facilitate mixing with the nanocarbon dispersion) before the latex is combined with the nanocarbon dispersion.

A preferred natural rubber is Standard Malaysian Rubber (SMR), for example SMR 10.

Other types of natural rubber that can be used, as latex, in the present invention are chemically modified natural rubber such as epoxidized natural rubber (ENR), for example ENR 25 and ENR 50.

The term "nanocarbon" is used herein to denote nano-sized particulate forms of carbon, especially carbon nanotubes (CNTs), graphite nanofibers (GNFs) and/or carbon nanofibers (CNFs). Carbon nanotubes are preferred. The carbon nanotubes can be either single-, double- or multi-walled. Preferred carbon nanotubes have a length of <50 μm and/or an outer diameter of <20 nm. Preferred carbon nanotubes have a C-purity of >85% and non-detectable free amorphous carbon. Such carbon nanotubes are typically supplied in the form of agglomerated bundles of with average dimensions of 0.05 to 1.5 mm.

The nanocarbon is employed in the invention without subjecting it to an acid treatment. In particular, the nanocarbon is not subjected to any treatment to make it more hydrophilic.

The nanocarbon is dispersed in a aqueous medium to form a nanocarbon dispersion. The nanocarbon dispersion is then combined with the natural rubber latex.

The concentration of the nanocarbon in the nanocarbon dispersion used in the present invention is generally 1% to 50% by weight. Preferably the concentration is 2% to 10%, more preferably 3% to 5% by weight (expressed as weight of nanocarbon relative to total weight of the dispersion).

The nanocarbon dispersion comprises the step of forming a slurry of the nanocarbon in an aqueous medium containing a surfactant and optionally a stabilizer. The slurry thus formed is then preferably subjected to grinding, for example by ball milling, to break down any agglomeration or aggregation of nanocarbon. The grinding process results in a uniform nanocarbon dispersion. The grinding process is typically carried out for 6 to 48 hours, preferably for 12 to 24 hours.

The pH of the nanocarbon dispersion and/or of the natural rubber latex is/are adjusted so that the two pHs become similar or identical before the dispersion and the latex are combined. Preferably, the difference between the pH of the nanocarbon dispersion and the pH of the natural rubber latex is less than 2 pH units, more preferably less than 1 pH unit, most preferably less than 0.5 pH units before the dispersion and the latex are combined. Typically, the pH of the natural rubber latex employed in the invention is between 10 and 12 (as received from the supplier) and the pH of the nanocarbon dispersion is adjusted to that of the natural rubber latex, if necessary, by adding a base, such as KOH, to the dispersion before it is mixed with the latex.

The nanocarbon dispersion and the natural rubber latex may be combined by adding the nanocarbon dispersion (and optionally a surfactant) to the natural rubber latex, for example by discharging the former into a vessel containing the latter. The mixture thus obtained is generally subjected to mechanical stirring until a uniform mixture is obtained.

The mixture containing the natural rubber latex and the nanocarbon may then be coagulated by known methods, for example by adding acetic acid. The coagulum thus formed may be washed with water and squeezed to remove excess surfactants and water. The coagulum may be cut into small granules and washed with water. These granules may then be dried, for example in an electrically heated oven, until they are fully dried. The resulting dry product, may be used in the granulated form or may be pressed into a bale (block rubber) form. The dry product may be used as natural rubber master batch for a wide variety of natural rubber applications like conventional dry rubber such as SMR grades.

The natural rubber composition of the present invention comprises 5 pphr or less of nanocarbon. Preferably, it comprises not less than 2 pphr of nanocarbon. ("pphr" stands for parts (by weight) per hundred parts (by weight) of rubber; thus, the composition contains 5 g or less of nanocarbon per 100 g of rubber). Compositions comprising more than 5 pphr of nanocarbon were found to result in worse mechanical properties. Preferably, the composition contains 2 to 5 pphr, more preferably 2.5 to 4.5 pphr, yet more preferably 3 to 4 pphr of nanocarbon.

Thus, the composition and method of the present invention overcome the problem of poor dispersion of nanocarbon when direct mixing of nanocarbon with dry rubber and yield improved physical properties and mechanical strength of the rubber composition.

In particular, tensile strength may be used to assess the quality of the vulcanized rubber resulting from the rubber composition of the invention because it is sensitive to flaws that arise from poor filler dispersion, imperfect molding and impurities. (This is because agglomerates of filler act as a flaw and provide sites for high stress concentration where failure occurs.) There is a strong correlation between poor dispersion of filler and low tensile strength.

The invention provides a simple way to effectively and uniformly disperse nanocarbon in a natural rubber matrix. Since rubber latex is in liquid form, the problem of a very viscous medium resulting form the use of dry rubber is eliminated. (The high viscosity of dry rubber creates problems with the dispersion of nanocarbon, and consequently the nanocarbon forms large agglomerates in the rubber matrix that lead to poor mechanical strength.) The invention also provides an improvement over the teaching of the prior art (especially CN 1663991 A and CN 1673261 A) in that it obviates the need to carry out an acid-treatment of the nanocarbon and in that it results in better physical and mechanical properties, such as improved hardness, improved modulus and/or improved tensile strength.

EXAMPLES

The present invention is illustrated by the following examples, which are not intended to limit the invention.

The nanocarbon used in the examples consisted of carbon nanotubes having a length of <50 μm and an outer diameter of <20 nm; it had a C-purity of >85% and non-detectable free amorphous carbon. In the examples according to the invention, it was employed as supplied, i.e. without pretreatment. In that state it existed as agglomerated bundles of CNTs with average dimensions of 0.05 to 1.5 mm.

All percentages stated in the examples are by weight unless stated otherwise. As is common in the field of rubber technology, "pphr" stands for parts per hundred parts of rubber.

Example 1

1. Preparation of Nanocarbon Slurry and Nanocarbon Dispersion

A 1% nanocarbon dispersion was prepared as follows: 3 g of nanocarbon was put into a glass beaker (500 ml) containing 15 g of a surfactant and 282 g of distilled water. The mixture was stirred by means of mechanical stirrer at 80 rpm for about 10 minutes to obtain a nanocarbon slurry. The slurry was transferred to a ball mill for grinding to break down any agglomerates of nanocarbon. Ball milling was done for 24 hours to obtain a nanocarbon dispersion, which was then transferred into a plastic container.

The surfactant was used in the form of a 10% to 20% solution.

In an analogous manner, a 3% nanocarbon dispersion was prepared from 9 g of nanocarbon, 45 g of surfactant and 246 g of distilled water.

The pH of dispersion was adjusted (by adding KOH) to that of the latex to which it was to be added.

2. Preparation of Nanocarbon-Containing Natural Rubber Master Batches

The nanocarbon dispersion prepared as described above was mixed with high ammonia natural rubber latex concentrate (HA NR latex). The latex concentrate was first diluted with distilled water to reduce its concentration in order to reduce the viscosity of the latex to facilitate mixing with the nanocarbon dispersion. The mixing with the nanocarbon dispersion was then done in the presence of about 5 pphr of surfactant (employed as a 5% to 20% solution).

The nanocarbon dispersion and the surfactant were discharged into a beaker containing the natural rubber (NR) latex. The mixture was subjected to mechanical stirring.

The NR latex was then coagulated with acetic acid. The coagulum formed was washed with water and squeezed to remove excess surfactants and water. The coagulum was cut into small granules and washed with water. These granules were then dried in an electrically heated oven until they were fully dried to obtain a nanocarbon-containing natural rubber masterbatch.

The amount of nanocarbon in the dispersion and the amount of the dispersion and the latex are chosen so as to obtain a predetermined ratio of nanocarbon to rubber (expressed herein in terms of pphr). More specifically, the master batch according to the invention contained 2 pphr of nanocarbon.

For comparison, mixes containing 5 pphr and 10 pphr of nanocarbon, respectively, were prepared from SMR 10. The nanocarbon was mixed directly with SMR10 in a laboratory internal mixer (Haake) of 399 ml capacity. Otherwise, all the compounding ingredients in the comparative mixes were the same as in the masterbatch according to the invention.

3. Examination of Physical Properties

The master batches prepared as described above were vulcanized as follows:

A rubber compound was prepared by mixing the masterbatch with sulfur, accelerator, zinc oxide and stearic acid by using either a 2-roll mill or in a laboratory internal mixer. The cure characteristic of the compounded rubber was determined by means of curemeter at 150° C. A vulcanized sheet of uniform thickness was prepared by compression molding, and vulcanized to its optimum state of cure at 150° C.

The hardness (in terms of the International Rubber Hardness Degree (IRHD)), the 100% and 300% modulus (strictly speaking, stress at 100% and 300% strain; M100 and M300) and the tensile strength were then determined by standard methods. Tensile strength was measured by using a tensile machine in accordance with ISO 37. The results are shown in the following table:

| Physical properties | | | |
|---|---|---|---|
| | Amount of nanocarbon (pphr) | | |
| | 2 | 5* | 10* |
| Hardness (IRHD) | 48 | 34 | 35 |
| Modulus M100 (MPa) | 1.14 | 1.4 | 0.6 |
| Modulus M300 (MPa) | 3.14 | 1.2 | 0.57 |
| Tensile Strength (MPa) | 26.3 | 10.4 | 11.2 |

*For comparison (not according to the invention)

The data show that the physical properties of vulcanized rubber are affected by the amount of nanocarbon incorporated into the rubber and the way the nanocarbon is incorporated into the rubber composition. The composition with 2 pphr of nanocarbon gave higher hardness, higher modulus and greater tensile strength than the comparative compositions with 5 and 10 pphr of nanocarbon.

This shows that the nanocarbon is better dispersed in the composition according to the invention than in the comparative compositions.

Example 2

An examination of the degree of dispersion of nanocarbon in rubber was made by means of scanning electron microscopy (SEM). SEM images were recorded of the fractured surfaces of vulcanized rubber compounds obtained as follows:
  (a) 5 pphr of nanocarbon was mixed directly with SMR 10 (Standard Malaysian Rubber 10, a well known technically specified rubber) by using the conventional mixing equipment (for comparison; not according to the present invention)
  (b) 3 pphr of nanocarbon was incorporated into rubber as described in Example 1

Figure 2:
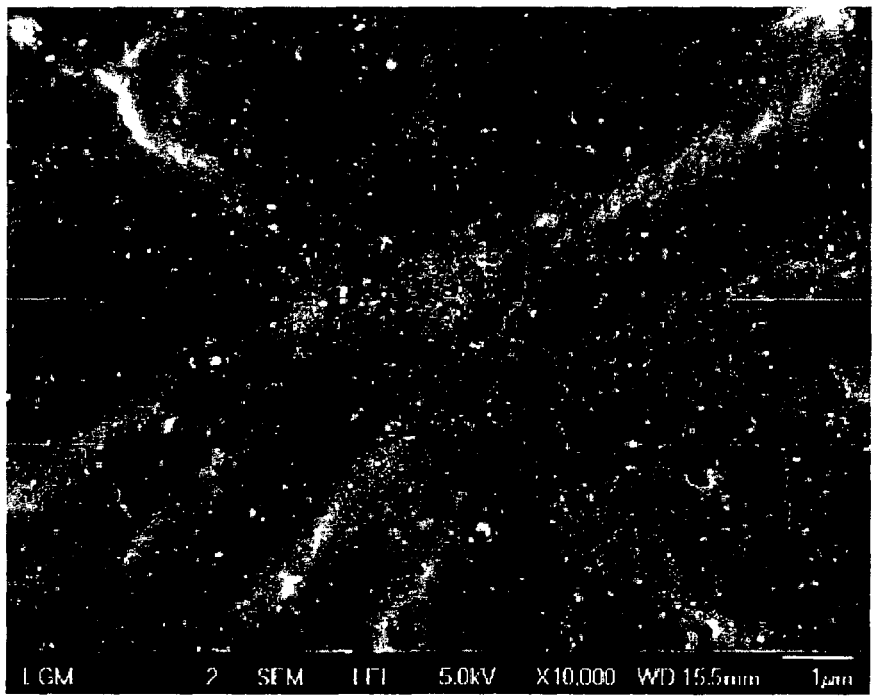
FIG. 2 is an SEM image of the fractured surface of vulcanized natural rubber filled with 2 pphr of CNT obtained according to the invention at 10,000-fold magnification.

The SEM images of the surface morphologies are shown in FIGS. 1 and 2, respectively. FIG. 1 shows clear evidence of undeserved nanocarbon that exists as big agglomerate. FIG. 2, on the contrary shows no evidence of agglomeration, i.e. that the nanocarbon is dispersed uniformly in the rubber matrix.

This experimental evidence proves that direct mixing of nanocarbon with dry rubber using conventional mixing equipment is not adequate to produce uniform dispersion of nanocarbon in the rubber matrix.

Example 3

The procedures of Example 1 were repeated, except that, before the nanocarbon slung was formed, the nanocarbon was subjected to an acid treatment as follows:

1 g of nanocarbon was added to 10 ml of an acid solution containing sulfuric acid and nitric acid (volume ratio of sulfuric acid:nitrate acid=3:1). The mixture was boiled for 30 minutes. Thereafter, the nanocarbon was rinsed and dried to obtain nanocarbon treated in boiling acid.

Using the acid treated nanocarbon, a latex masterbatch was prepared as in Example 1; the amount of nanocarbon was 2 pphr. The hardness, tensile strength and elongation at break were determined. The results are shown in the following table together with the corresponding results obtained with untreated nanocarbon.

| Physical properties | | |
|---|---|---|
| | Untreated Nanocarbon | Treated nanocarbon* |
| Hardness (IRHD) | 48 | 46 |
| Tensile Strength (MPa) | 26.3 | 20.0 |
| Elongation at break (%) | 612 | 492 |

*For comparison (not according to the invention)

Clearly, the mechanical properties obtained with untreated nanocarbon according to the present invention are significantly better than those obtained with acid treated nanocarbon according to the prior art.

The invention claimed is:

1. A natural rubber composition comprising 5 pphr, parts by weight per hundred parts by weight rubber, or less of nanocarbon, wherein the composition is prepared from a nanocarbon dispersion and natural rubber latex by providing an uniform dispersion of nanocarbon in an aqueous medium, and adding the dispersion of nanocarbon to a natural rubber latex, and wherein the nanocarbon has not been subjected to an acid treatment before incorporation into the rubber composition wherein the nanocarbon has a C-purity of >85% and non-detectable free amorphous carbon.

2. The composition according to claim 1, wherein the nanocarbon comprises carbon nanotubes having a length of <50 µm and an outer diameter of <20 nm.

3. The composition according to claim 1, further comprising carbon black wherein the relative amount of nanocarbon to carbon black is in the range of 1:40 to 1:2.

4. The composition according to claim 1, wherein the composition comprises not less than 2 pphr, parts by weight per hundred parts by weight rubber, of nanocarbon.

5. The composition according to claim 1, wherein the composition is a liquid composition obtained by combining a liquid dispersion of the nanocarbon and a latex of the natural rubber.

6. The composition according to claim 1, wherein the composition is a dry composition obtained by coagulating the natural rubber in the composition and drying the coagulate.

7. A method of making a natural rubber composition comprising nanocarbon, wherein the method comprises the following steps:
providing a dispersion of nanocarbon in an aqueous medium, and
combining the dispersion of nanocarbon with a natural rubber latex,
and wherein the nanocarbon is not subjected to an acid treatment before incorporation into the rubber composition and the natural rubber composition comprises 5 pphr or less of nanocarbon, wherein the nanocarbon has a C-purity of >85% and non-detectable free amorphous carbon.

8. The method according to claim 7, wherein the nanocarbon comprises carbon nanotubes having a length of <50 µm and an outer diameter of <20 nm.

9. The method according to claim 7, further comprising carbon black wherein the relative amount of nanocarbon to carbon black is in the range of 1:40 to 1:2.

10. The method according to claim 7, wherein the composition comprises not less than 2 pphr of nanocarbon.

11. The method according to claim 7, wherein the dispersion of nanocarbon contains a surfactant.

12. The method according to claim 7, wherein the pH of the dispersion of nanocarbon and/or the pH of the natural rubber latex is/are adjusted so that the difference between the pH of the nanocarbon dispersion and the pH of the natural rubber latex is less than 2 pH units before the dispersion and the latex are combined.

13. The method according to claim 7, wherein the concentration of the nanocarbon in the nanocarbon dispersion is 2% to 10% by weight.

14. The method according to claim 7, wherein the step of providing the dispersion of nanocarbon comprises the steps of forming a slurry of the nanocarbon in an aqueous medium containing a surfactant and subjecting the slurry to grinding.

15. The method according to claim 14, wherein the grinding is ball milling.

16. The composition according to claim 1, wherein the pH of nanocarbon and/or the pH of the natural rubber latex is/are adjusted so that the difference between the pH of the nanocarbon dispersion and the pH of the natural rubber latex is less than 2 pH units before the dispersion and the latex are combined.

* * * * *